United States Patent [19]

White, Jr. et al.

[11] Patent Number: 4,830,641
[45] Date of Patent: May 16, 1989

[54] SORBING APPARATUS

[75] Inventors: Donald H. White, Jr., Homer, N.Y.; Marcel G. Verrando, Ocala, Fla.

[73] Assignee: Pall Corporation, Glen Cove, N.Y.

[21] Appl. No.: 37,312

[22] Filed: Apr. 13, 1987

[51] Int. Cl.⁴ ............................................. B01D 53/04
[52] U.S. Cl. ..................................... 55/161; 55/162; 55/163; 55/179; 55/387; 55/389
[58] Field of Search ................. 55/212, 387, 389, 524, 55/161-163, 179; 210/679, 143, 266, 269, 275-279, 284, 502.1, 504, 506, 510.1

[56] References Cited

U.S. PATENT DOCUMENTS

| | | | |
|---|---|---|---|
| 2,944,627 | 7/1960 | Skarstrom | 183/4.7 |
| 3,025,233 | 3/1962 | Figert | 210/502 |
| 3,225,518 | 12/1965 | Skarstrom et al. | 55/33 |
| 3,237,379 | 3/1966 | Kant et al. | 55/58 |
| 3,313,091 | 4/1967 | Berlin | 55/58 |
| 3,455,458 | 7/1969 | Johnson | 210/197 |
| 3,519,398 | 7/1970 | Roberts | 23/281 |
| 3,594,984 | 7/1971 | Toyama et al. | 55/33 |
| 3,659,399 | 5/1972 | Kauer, Jr. et al. | 55/33 |
| 3,950,251 | 4/1976 | Hiller | 210/232 |
| 4,060,913 | 12/1977 | Yoshida et al. | 34/80 |
| 4,062,129 | 12/1977 | Yoshida et al. | 432/40 |
| 4,165,972 | 8/1979 | Iles et al. | 55/28 |
| 4,237,538 | 12/1980 | Le Dall | 364/500 |
| 4,261,832 | 4/1981 | Schumacher et al. | 210/502.1 |
| 4,269,611 | 5/1981 | Anderberg | 55/179 |
| 4,280,913 | 7/1981 | Applegate et al. | 210/669 |
| 4,293,378 | 10/1981 | Klein | 162/145 |
| 4,295,863 | 10/1981 | Lattuada | 55/21 |
| 4,322,223 | 3/1982 | Christel, Jr. | 55/18 |
| 4,341,539 | 7/1982 | Gidaspow et al. | 55/278 |
| 4,383,920 | 5/1983 | Muller et al. | 210/87 |
| 4,400,305 | 8/1983 | Takeuchi et al. | 252/430 |
| 4,421,567 | 12/1983 | Kulprathipanja et al. | 127/46.3 |
| 4,431,456 | 2/1984 | Kulprathipanja | 127/46.3 |
| 4,687,573 | 8/1987 | Miller et al. | 210/284 |

FOREIGN PATENT DOCUMENTS

| | | |
|---|---|---|
| 0056724 | 1/1982 | European Pat. Off. . |
| 0072569 | 8/1982 | European Pat. Off. . |
| 0117316 | 3/1983 | European Pat. Off. . |
| 1163426 | 9/1969 | United Kingdom . |
| 1362912 | 8/1974 | United Kingdom . |
| 1527753 | 11/1974 | United Kingdom . |
| 1476537 | 6/1977 | United Kingdom . |
| 1499532 | 1/1978 | United Kingdom . |
| 1561382 | 2/1980 | United Kingdom . |
| 1569346 | 6/1980 | United Kingdom . |
| 1584559 | 2/1981 | United Kingdom . |
| 1587100 | 4/1981 | United Kingdom . |
| 1597035 | 9/1981 | United Kingdom . |
| 1600895 | 10/1981 | United Kingdom . |
| 2082614 | 12/1984 | United Kingdom . |
| 2083487 | 3/1985 | United Kingdom . |

OTHER PUBLICATIONS

"Zeolites of the Heulandite Group", *Natural Zeolites*, Gottardi et al., Springer-Verlag, 1985.
"Molecular Sieves", Reprinted from *Scientific American*, Breck et al.
"Crystalline Molecular Sieves", *Union Carbide Adsorbents & Catalysts*, Breck.
"Regenerable Pressure-Swing Adsorption Systems for Continuous Chemical Warfare Collective Protection", Naval Research Lab., 1986.

*Primary Examiner*—Ivars Cintins
*Attorney, Agent, or Firm*—Leydig, Voit & Mayer

[57] ABSTRACT

The disclosure describes a sorbing apparatus comprising at least one chamber having first and second ports and defining a fluid flow path between the first and second ports. The chamber includes a bed of sorbent particles which are disposed in the fluid flow path and the sorbent bed includes particles of clinoptilolite. The sorbing apparatus further comprises fluid control means for alternately directing fluid containing the substance through the bed of sorbent particles, whereby the bed of sorbent particles sorbs at least a portion of the substance from the fluid, and directing a purging fluid through the bed of sorbent particles, whereby the bed of sorbent particles is regenerated.

11 Claims, 1 Drawing Sheet

SORBING APPARATUS

TECHNICAL FIELD

The present invention relates to apparatus for removing all or a portion of a substance from a fluid containing the substance. In particular, it relates to an apparatus which includes a sorbent material for sorbing the substance from the fluid.

BACKGROUND ART

In a variety of commercial and industrial settings, it is necessary to remove all or a portion of a substance from a fluid, i.e., a gas or a liquid, before the fluid can be used for a particular purpose. For example, before contaminated water can be drunk or contaminated air can be breathed, any hazardous contaminants must be removed. Likewise, before compressed air can be used, for example to drive power tools, any water vapor should be removed. If the water vapor is not removed, it may condense in the piping or in the tools, causing rust or otherwise corroding the equipment.

Many types of devices are available to remove a substance from a fluid. One particularly effective class of devices characteristically comprises an apparatus which directs a flow of the fluid through a sorbent material. A sorbent material is one which sorbs, i.e., absorbs or adsorbs, certain substances. Usually, sorbent materials are riddled with microscopic pores interconnected with one another, allowing the fluid to flow through the pores. Further, the sorbent material is typically in the form of a bed of particles of the sorbent material contained in a cylindrical chamber. During a sorbing phase, the fluid containing the substance is pumped into one end of the chamber and then passed through the sorbent particle bed where at least a portion of the substance is sorbed by the sorbent material. The fluid, now substantially free or at least containing less of the substance, is then removed from the other end of the chamber.

To extend the useful life of these sorbing apparatus, the sorbent bed is periodically regenerated, i.e., stripped of the substances that it has sorbed from the fluid. During a regenerating phase, a heated and/or substance-free fluid is flushed through the sorbent bed, purging the substance from the sorbent particles. This purging fluid, now containing much of the substance previously sorbed by the sorbent bed, is then exhaustedfrom the chamber. Once the sorbent bed is sufficiently free of the substance, the fluid containing the substance is again pumped through the chamber and the regenerated sorbent bed continues sorbing the substance from the fluid. The sorbing apparatus can continue cycling between the sorbing phase and the regenerating phase for an extended period.

As effective as these apparatus are, they nevertheless have several undesirable characteristics. For example, many sorbent materials, including alumina, are relatively soft and may crumble or otherwise disintegrate as the fluid flows through the sorbent bed and causes the sorbent particles to collide with one another. Many sorbent materials further disintegrate when they are exposed to heat and water, both of which are often present in the sorbent bed because heat is naturally produced during the sorbing phase and because the substance sorbed by the sorbent material frequently is water. A disintegrating sorbent material may generate significant quantities of sorbent dust, i.e.,small fragments of the sorbent particles which are swept along with the fluid flowing through the sorbent bed. This sorbent dust is extremely abrasive and may damage any downstream pipes and valves if it escapes the chamber.

Another undesirable characteristic of conventional sorbing apparatus is that many sorbent materials, including alumina and molecular sieve, may become clogged if the fluid contains a hydrocarbon such as oil. For example, if the sorbing apparatus is removing water vapor from compressed air, oil vapor from the compressor may also find its way into the air. While the pores of the sorbent material are very small, the molecules of oil as well as the molecules of water are even smaller. Consequently, both the water molecules and the oil molecules penetrate the pores of the sorbent material and are then sorbed by the sorbent material. However, not all of the oil which penetrates the sorbent material is removed during the regenerating phase. Consequently, over a period of time, the sorbent material becomes more and more clogged with oil and less and less able to remove the water vapor from the air.

DISCLOSURE OF THE INVENTION

The present invention provides an improved apparatus for sorbing at least a portion of a substance from a gas containing the substance. In accordance with the invention, the sorbing apparatus comprises and intake, an outlet, an exhaust, and first and second sorbing chambers. Each sorbing chamber has first and second ports and defines a gas flow path between the first and second ports. Further, each chamber includes a bed having a sorbent material disposed in the gas flow path for sorbing the substance from the gas, the sorbent material comprising non-immobilized particles of clinoptilolite. The sorbing apparatus also comprises a first valve assembly interconnecting the intake, the exhaust, and the first ports of the first and second sorbing chambers and comprises a second arrangement for interconnecting the outlet and the second ports of the first and second sorbing chambers. The sorbing apparatus further comprises a controller coupled to at least the first valve assembly for alternately first directing gas from the intake through the first sorbing chamber to the outlet while channeling a portion of the outlet gas through the second sorbing chamber to the exhaust and directing gas from the intake through the second sorbing chamber to the outlet while channeling a portion of the outlet gas through the first sorbing chamber to the exhaust. Consequently, the sorbent bed in each sorbing chamber alternately sorbs the substance from the intake gas and is regenerated by the outlet gas.

The invention further provides a sorbing apparatus comprising an intake, an outlet, an exhaust, and first and second cylindrical sorbing chambers. Each sorbing chamber includes a bed having a sorbent material comprising non-immobilized particles of clinoptilolite. Each sorbing chamber also includes first and second ports respectively communicating with the ends of the sorbent bed. The sorbing apparatus also comprises a first valve assembly interconnecting the intake, the exhaust, and the first ports of the first and second sorbing chambers and comprises a second assembly interconnecting the outlet and the second ports of the first and second sorbing chambers. The sorbing apparatus further comprises a controller coupled to at least the first valve assembly for simultaneously directing intake gas through one sorbing chamber to the outlet and a portion of the outlet gas through the other sorbing chamber to the exhaust.

A sorbing apparatus which has a bed of sorbent particles comprising particles of clinoptilolite in accordance with the invention offers many significant advantages over conventional sorbing apparatus. For example, clinoptilolite is much harder than many other sorbent materials and therefore much less subject to disintegration due to the effects of fluid flowing through the sorbent bed or the effects of fluid water and heat. Further, clinoptilolite has pores which are much smaller than oil molecules so the oil molecules are unable to penatrate the pores of the clinoptilolite. Consequently, a sorbent bed comprising particles of clinoptilolite is subject to much less clogging and may have a significantly longer useful life.

Another advantage of clinoptilolite is that it is more dense than many other sorbent materials, allowing the more compact design for the sorbing apparatus. The increased density of clinoptilolite allows a certain weight of clinoptilolite to be placed into a smaller chamber than the same weight of other sorbent materials. Further, the increased density of clinoptilolite allows it to better retain in a small chamber the heat produced when the substance is sorbed from the fluid. Retention of this heat is frequently very important for effective regeneration of the sorbent bed. Consequently, sorbing materials which are less dense than clinoptilolite and are placed in a small chamber may not effectively retain the heat and, therefore, may not effectively allow regeneration of the sorbent bed.

BEST MODE FOR CARRYING OUT THE INVENTION

Figure 1:
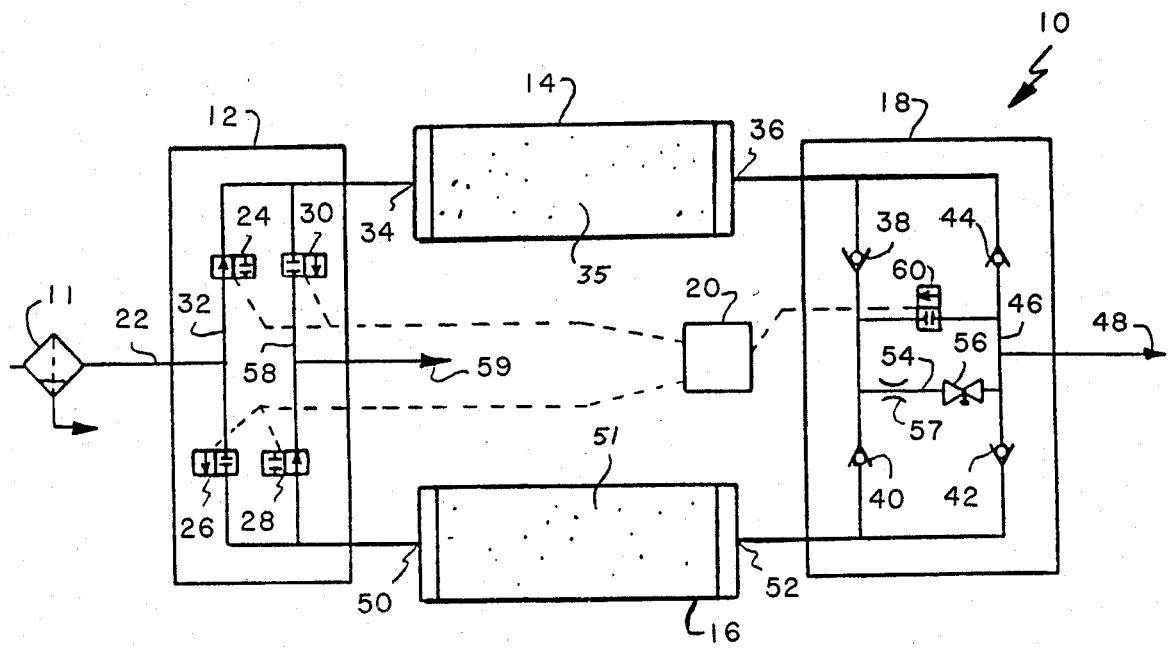
FIG. 1 is a block diagram of an exemplary sorbing apparatus embodying the present invention.

As shown in FIG. 1, an exemplary sorbing apparatus 10 embodying the present invention generally comprises a prefilter 11, an intake manifold-valve structure 12, first and second identical sorbing chambers 14, 16, an outlet manifold-valve structure 18, and a control system 20. The prefilter 11, the manifold-valve structures 12, 18 and the control system 20, as well as the general operational aspects of the sorbing apparatus 10, are well known in the art and are subject to many variations. For example, the control system 20 may comprise either an electronically or a pneumatically operated system, or the sorbing apparatus 10 may additionally include one or more heaters (not shown) operatively associated with the first and second sorbing chambers 14, 16. Further, the sorbing apparatus 20 may alternatively comprise only a single sorbing chamber or more than two sorbing chambers. Thus, the sorbing apparatus 20 may comprise any suitable apparatus for sorbing a substance from a fluid containing the substance, including a temperature swing sorbing apparatus or a purge sweep sorbing apparatus. However, the exemplary sorbing apparatus 10 preferably comprises a pressure swing sorbing apparatus which contains the heat of adsorption within the sorbing chambers 14, 16 for regeneration and, therefore, does not have a heater associated with either sorbing chamber 14, 16 or with the purging fluid.

In the exemplary sorbing apparatus 10 of FIG. 1, an influent fluid containing one or more substances, such as water vapor or a chemical contaminant, is first directed through the prefilter 11 which removes solid particles and/or liquid aerosols from the fluid. The fluid is then directed by the intake manifold-valve structure 12 from an intake 22 into one of the two sorbing chambers 14, 16. For example, if the control system 20, which is coupled to each of four solenoid valves 24, 26, 28, 30 of the intake manifold-valve structure 12, opens the first and third valves 24, 28 and closes the second and fourth valves 26, 30, the influent fluid is directed from the intake 22 along an intake line 32 and into the first sorbing chamber 14 through a first port 34.

Both sorbing chambers 14, 16 contain a bed 35, 51 of sorbent material capable of sorbing the substance from the influent fluid. For example, if the influent fluid is wet air, the sorbing chambers 14, 16 may contain a bed 36 of sorbent material capable of sorbing water vapor from the air. Alternatively, if the influent fluid is water or air contaminated with chemical pollutants or other hazardous contaminants, the sorbing chambers 14, 16 may contain a bed 36 of sorbent material capable of sorbing the hazardous contaminants. The influent fluid enters the first port 34 of the first sorbing chamber 14 at a preselected pressure and passes through the sorbent bed 35 where all of or at least a portion of the substance is sorbed from the fluid. An effluent fluid containing none of, or at least a much lower concentration of, the substance then exits the first sorbing chamber 14 through a second port 36. The effluent fluid is then directed by check valves 38, 40, 42, 44 of the outlet manifold-valve structure 18 from the first sorbing chamber 14 along an outlet line 46 to an outlet 48.

To regenerate the sorbent material in the first sorbing chamber 14, the control system 20, after a certain length of time, closes the first and third valves 24, 28 and opens the second and fourth valves 26, 30 of the intake manifold-valve structure 12. The influent fluid is then directed from the intake 22 along the intake line 32 and into the second sorbing chamber 16 through a first port 50 where the substance in the influent fluid is sorbed by the sorbent bed 51 in the second sorbing chamber 16. The effluent fluid exits the second sorbing chamber 16 through a second port 52 and is directed by the check valves 38, 40 42, 44 of the outlet manifold-structure 18 along the outlet line 46 to the outlet 48.

A portion of the effluent fluid is used as a purge fluid and is passed along a purge line 54 through an adjustable purge valve 56 and an orifice 57 and through the second port 36 into the first sorbing chamber 14, which was depressurized when the fourth valve 30 was opened by the control system 20. The sorbent material in the bed 35 of the first chamber 14, which was warmed by the heat of absorption when the influent fluid was being passed through the first sorbing chamber 14, desorbs the substance into the purge fluid. An exhaust fluid having a high concentration of the substance then exits the first sorbing chamber 14 through the first port 34 and is directed by the solenoid valves 24, 26, 28, 30 of the intake manifold-valve structure 12 along an exhaust line 58 to an exhaust 59.

Once the bed 35 of sorbent material in the first sorbing chamber 14 has been sufficiently regenerated, the control system 20 opens the first and third solenoid valves 24, 28, and closes the second and fourth solenoid valves 26, 30. This redirects the influent fluid through the first sorbing chamber 14 and a portion of the effluent fluid through the second sorbing chamber 16, which repressurizes the first sorbing chamber 14 and regenerates the bed 51 of sorbent material in the second sorbing chamber 16. The control system 20 may optionally be coupled to a repressurization valve 60. To quickly repressurize the first chamber 14, the control system 20 closes the fourth solenoid valve 30 and briefly opens the repressurization valve 60 before closing the second solenoid valve 26 or opening the first and third solenoid valves 24, 28. The control system 20 continues, for an extended period, this cyclical process of alternately sorbing the substance from the influent fluid in the first chamber 14 while simultaneously regenerating the sorbent material in the second chamber 16 and then regenerating the sorbent material in the first chamber 14 while simultaneously sorbing the substance from the influent fluid in the second chamber 16. In a pressure swing sorbing apparatus, the timing of the cycles is designed in a known manner to effectively utilize the heat of sorption to regenerate the sorbent beds.

In accordance with one aspect of the invention, the sorbent material comprising the bed in each sorbing chamber includes clinoptilolite, a naturally occurring and abundant mineral. In the exemplary sorbing apparatus 10 shown in FIG. 1, the only significant sorbent material in each sorbent bed 35, 51 is clinoptilolite, i.e., each sorbent bed 35, 51 consists essentially of particles of clinoptilolite. The sorbent beds 35, 51 may be formed in any suitable manner. For example, the particles of clinoptilolite may be loosely loaded into each chamber 14, 16 or may be loaded into each chamber 14, 16 and maintained under compression, e.g., by a conventional springloading mechanism, to minimize channelization and fluidization of the sorbent bed 35, 51. Such non-immobilized, i.e., loosely or compressively loaded, sorbent beds are preferably contained in vertically oriented chambers to further minimize channeling and preferably include particles of clinoptilolite having a size in the range from about 1/16 to about ½ inch and most preferably about ¼ inch.

Alternatively, the sorbent beds 35, 51 may be immobilized, i.e., the particles of clinoptilolite may be bound in a self-supporting structure or bed in any suitable manner. For example, as disclosed in European Patent Application No. 84309094.5, published under Publication No. 0148638 on July 17, 1985, the particles of clinoptilolite may be interspersed in and bound by a mass of nonwoven, synthetic polymeric microfibers, e.g., polypropylene microfibers. Further, as disclosed in European Patent Application No. 85305652.1, published under Publication No. 0172003 on Jan. 19, 1986, the particles of clinoptilolite may be bound by mixing preheated particles of clinoptilolite with particles of a thermoplattic or thermosetting binder material and then heating and compressing the mixture. As the mixture cools, it forms a self-supporting structure in which the particles of clinoptilolite are immobilized by the binder material, but the sorbent properties of the clinoptilolite are uneffected. With the particles of clinoptilolite immobilized, the bed may be contained in either a vertically or horizontally oriented chamber without risk of channelization. U.S. patent application Ser. No. 640,356, recently allowed, discloses similar immobilizing techniques and is incorporated by reference along with European Patent Applications Nos. 85305652.1 and 84309094.5.

A sorbing apparatus including a sorbent bed comprising particles of clinoptilolite offers many advantages over conventional sorbing apparatus. For example, clinoptilolite has a granular hardness superior to that of many conventional sorbent materials so less sorbent dust is generated as the fluid flows through the sorbent bed and the sorbent particles abrade one another. Further, the hard particles of clinoptilolite are less subject to hydrothermal degradation than many conventional sorbent materials, again decreasing the amount of dust which may be generated. With less dust generated in the sorbent bed, fluid flow rates through the sorbent bed can be higher than those of conventional sorbing apparatus.

In addition, clinoptilolite has a very small pore size, i.e., on the order of about 3.5 angstrom. This pore size is sufficiently large to allow substances, such as water vapor or oxygen, to diffuse through the sorbent material but it is too small to permit diffusion of larger molecules, such as molecules of hydrocarbons or alcohols. Thus, contaminants, such as oil vapors, which penetrate and foul many conventional sorbent materials are unable to effectively penetrate clinoptilolite. Consequently, the useful service life of a sorbent bed comprising only clinoptilolite is expected to be superior to that of other conventional sorbent materials.

Another advantage of clinoptilolite is that it is more dense, i.e., about 25 percent more dense, than many conventional sorbent materials and, therefore, permits a more compact design for the sorbing apparatus 10. The increased density of clinoptilolite allows a given weight of clinoptilolite to be loaded in a smaller chamber than the same weight of less dense sorbent material. Further, since the specific heat of clinoptilolite is comparable to that of many conventional sorbent materials but its density is higher, the smaller bed of clinoptilolite can be used to retain the same amount of heat of adsorption as larger conventional sorbent beds. This ability to retain the heat of adsorption is particularly important for a pressure swing sorbing apparatus.

The effectiveness of a sorbing apparatus including a sorbent bed comprising particles of clinoptilolite is surprising because clinoptilolite has properties which point directly away from its usefulness as a sorbent material in a sorbing apparatus. For example, the BET surface area of activated alumina is about 300 square meters per gram (sq.m/g). Molecular sieve has a BET surface area of about 800 sq.m/g. On the other hand, clinoptilolite has a BET surface area of only about 13 sq.m/g, i.e., only about 2-4 percent of the BET surface area of these conventional sorbent materials.

The water adsorption capacity of clinoptilolite is also much lower than many conventional sorbent materials. For example, the water adsorption capacity of molecular sieve is about 0.25 grams of water per gram of molecular sieve (g water/g) while the water adsorption capacity of silica gel is about 0.40 g water/g. On the other hand, clinoptilolite has a water adsorption capacity of only about 0.12 g water/g. i.e., only about 30-48 percent of the water adsorption capacity of these conventional sorbent materials. Many conventional sorbent materials have a large macropore structure to facilitate diffusion inside the sorbent particles. Clinoptilolite has a very poor macropore structure which may actually inhibit mass transfer.

In spite of these properties, it has been found that a sorbing apparatus including a sorbent bed comprising only particles of clinoptilolite compares very favorably to a conventional sorbing apparatus. Two pressure swing sorbing apparatus, one including only activated alumina as the sorbing material and the other including only clinoptilolite as the sorbing material in accordance with the present invention, were operated under the same conditions to remove water vapor from air. Each sorbing apparatus had a sorbent bed diameter of 4.5 inches and a sorbent bed length of 50 inches. The air entered each sorbing chamber with a relative humidity of approximately 50 percent and an inlet flow of approximately 40 SCFM at 90 psia while the purge flow through each sorbent chamber was approximately 13 SCFM at atmospheric pressure. While the conventional alumina sorbing apparatus produced an effluent having a somewhat lower pressure dew point, i.e., about $-46$ degrees F., the effluent from the clinoptilolite sorbing apparatus according to the present invention was $-21$ degrees F., which is entirely satisfactory for many applications.

To decrease the dew point of a substance in the effluent of a sorbing apparatus, the sorbent bed may, in accordance with another aspect of the invention, comprise particles of clinoptilolite and particles of one or more additional conventional sorbent materials. The conventional sorbent material or materials added depend on the particular application but may include carbon particles as well as particles of alumina, silica gel or molecular sieve. Such a multiple sorbent bed may be variously configured. For example, the particles of clinoptilolite may be blended with the particles of the conventional sorbent material, yielding a uniform multiple sorbent bed. However, the multiple sorbent bed preferably comprises two or more distinct regions, each region having particles of only one sorbent material. Further, all of the regions may be formed together as a single loosely loaded, compressively loaded, or immobilized bed. Alternatively, each region may be separately formed as a loosely loaded, compressively loaded, or immobilized portion of the sorbent bed.

Figure 2A:
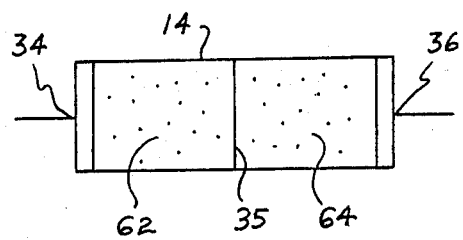
FIGS. 2(a)-2(c) illustrate alternative embodiments of the sorbing chambers shown in FIG. 1.
Figure 2B:
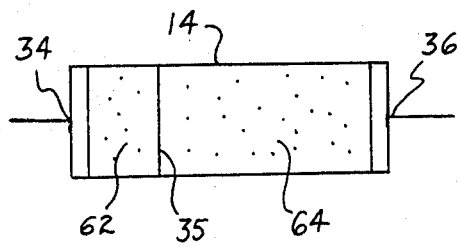
Figure 2C:
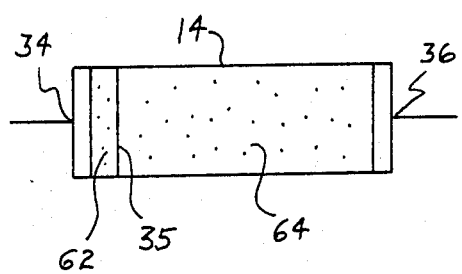

Thus, the exemplary sorbing apparatus 10 may be fitted with any of the sorbing chambers shown in FIGS. 2(a)-2(c). (For purpose of simplication, FIGS. 2(a)-2(c) shown only a modification of the first sorbing chamber 14 of FIG. 1.) As shown in these figures, the sorbent bed 35 comprises first and second distinct regions 62, 64. The first region 62 comprises particulates of a single conventional sorbent material while the second region 64 comprises only particles of clinoptilolite. In the exemplary sorbing apparatus 10, the second sorbing region 64 including the clinoptilolite is preferably disposed nearer the second port 35, i.e., the port thorugh which the fluid flows after the substance has been sorbed from the fluid, than the first sorbing region 62. Alternatively, the relative positions of the sorbing regions 62, 64 may be reversed.

The ratio of the volume of the conventional sorbent material to the volume of the clinoptilolite in each sorbing chamber 14 may vary from one sorbing apparatus to another, depending on the particular application. For example, FIG. 2(a) shows a sorbing chamber having a 50/50 ratio, FIG. 2(b) shows a sorbing chamber having a 25/75 ratio, and FIG. 2(c) shows a sorbing chamber having a 10/90 ratio.

In a test comparing two pressure swing sorbing apparatus, one including only activated alumina as the sorbent material and the other including first and second distinct, equal-volume regions of activated alumina and clinoptilolite, respectively, as shown in FIG. 2(a), the effluent dew point of the two sorbing apparatus were approximately equal. Again each sorbing apparatus had a sorbent bed diameter of 4.5 inches and a sorbent bed length of 50 inches; the air entered each sorbing chamber with a relative humidity of approximately 50 percent and an inlet flow of approximately 40 SCFM at 95 psia; and the purge flow through each sorbent chamber was approximately 13 SCFM at atmospheric pressure. Under these conditions, the effluent dew point of each sorbing apparatus was approximate $-80$ degrees F.

Although the present invention has been described in terms of one or more particular embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

We claim:

1. A sorbing apparatus for removing at least a portion of a substance from a gas containing the substance, the sorbing apparatus comprising an intake; an outlet; and exhaust; first and second sorbing chambers, each having first and second ports and defining a gas flow path therebetween and each including a bed having sorbent means disposed in the gas flow path for sorbing the substance from the gas, the sorbent means comprising non-immobilized particles of clinoptilolite; a first valve assembly interconnecting the intake, exhaust, and the first ports of the first and second sorbing chambers; a second arrangement for interconnecting the outlet and the second ports of the first and second sorbing chambers; and a controller coupled to at least the first valve assembly for alternately first directing gas from the intake through the first sorbing chamber to the outlet while channeling a portion of the outlet gas through the second sorbing chamber to the exhaust and directing gas from the intake through the second sorbing chamber to the outlet while channeling a portion of the outlet gas through the first sorbing chamber to the exhaust, whereby the sorbent bed in each sorbing chamber alternately sorbs the substance from the intake gas and is regenerated by the outlet gas.

2. The sorbing apparatus of claim 1 wherein the sorbent means consists essentially of particles of clinoptilolite.

3. The sorbing apparatus of claim 1 wherein the sorbent means further includes particles of at least one additional sorbent material.

4. The sorbing apparatus of claim 3 wherein the sorbent means comprises at least first and second regions, the first region consisting essentially of particles of the additional sorbent material and the second region consisting essentially of particles of clinoptilolite.

5. The sorbing apparatus of claim 4 wherein the first port of the chamber comprises an inlet for the gas containing the substance and the second port comprises an outlet for the gas after at least a portion of the substance has been sorbed from the gas and wherein the second region is disposed nearer the second port than the first region.

6. The sorbing apparatus of claim 4 wherein the ratio of the volume of the additional sorbent material to the volume of the clinoptilolite is about 50/50, 25/75, or 10/90.

7. The sorbing apparatus of claim 3 wherein the additional sorbing material comprises alumina.

8. The sorbing apparatus of claim 1 wherein the sorbent particles are loosely loaded into the chamber.

9. The sorbing apparatus of claim 1, wherein the sorbent particles are compressively loaded into the chamber.

10. The sorbing apparatus of claim 1 wherein the sorbing apparatus includes means for containing the heat of adsorption and does not include a heater associated with the sorbent bed or with the outlet gas.

11. A sorbing apparatus for removing at least a portion of a substance from a gas containing the substance, the sorbing apparatus comprising an intake; an outlet; an exhaust; first and second cylindrical sorbing chambers, each including a bed having sorbent means for sorbing the substance from the gas, and first and second ports respectively communicating with the ends of the sorbent bed, the sorbent bed comprising non-immobilized particles of clinoptilolite; a first valve assembly interconnecting the intake, the exhaust, and the first ports of the first and second sorbing chambers; a second assembly interconnecting the outlet and the second ports of the first and second sorbing chambers; and a controller coupled to at least the first valve assembly for simultaneously directing intake gas through one sorbing chamber to the outlet and a portion of the outlet gas through the other sorbing chamber to the exhaust.

* * * * *